Dec. 17, 1946.     T. C. HILL     2,412,810
SWIVELING FLUID JOINT
Filed Sept. 9, 1944     2 Sheets-Sheet 1
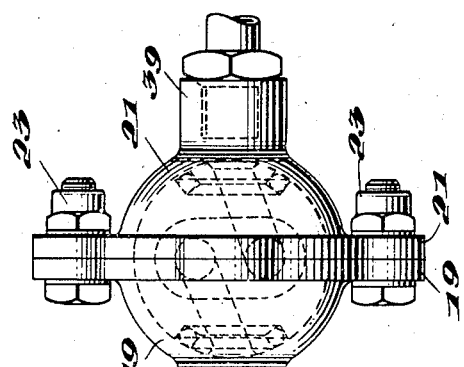
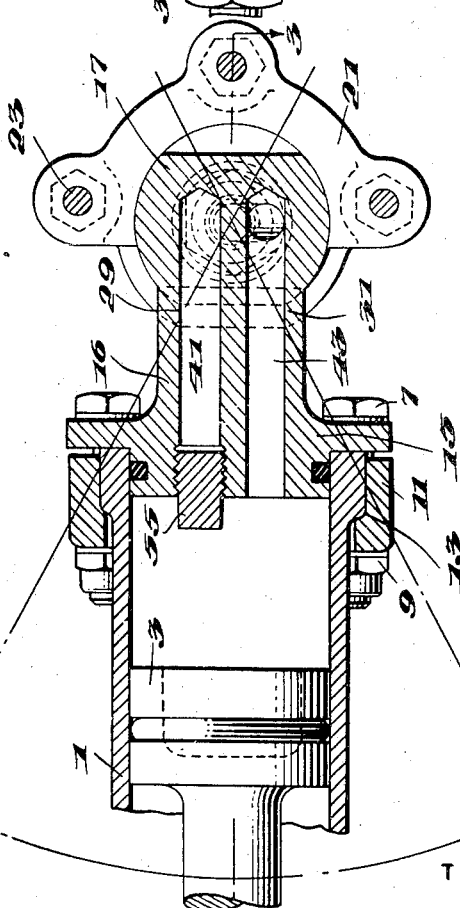
Inventor
THOMAS C. HILL
By Donald W. Farrington
Attorney

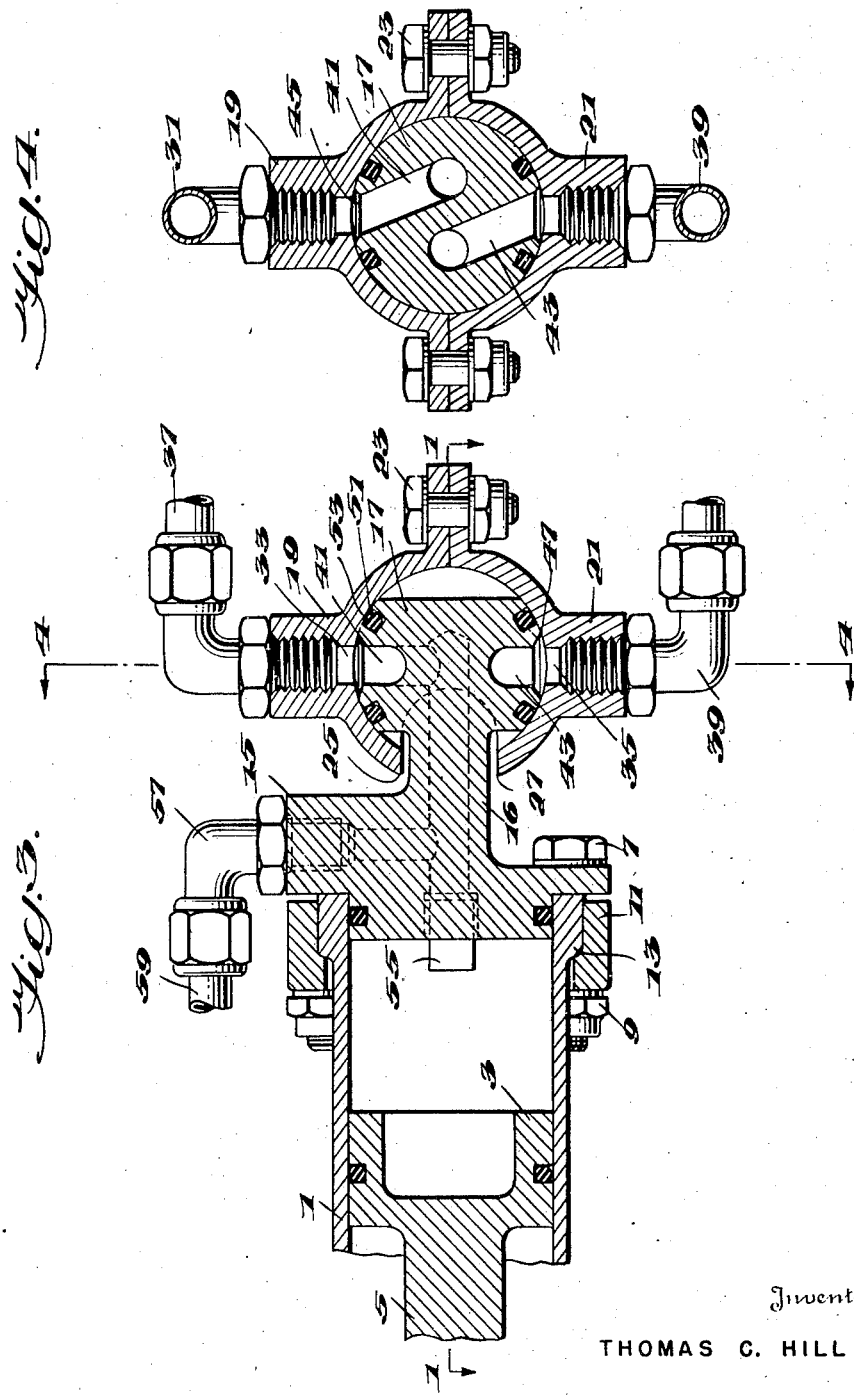

Patented Dec. 17, 1946

2,412,810

UNITED STATES PATENT OFFICE 2,412,810

SWIVELING FLUID JOINT

Thomas C. Hill, Parkville, Md., assignor to The Glenn L. Martin Company, Middle River, Md., a corporation of Maryland Application September 9, 1944, Serial No. 553,354

5 Claims. (Cl. 285—96.3)

This invention relates to a swivellable plural fluid joint, and more particularly to a double pipe joint for introducing and removing fluid from a hydraulic motor or the like where the motor cylinder may be out of axial alignment with the rigid fluid supply line.

An object of the invention is to provide a swivellable head on the end of a hydraulic cylinder in such a manner that the hydraulic lines leading to and from the cylinder will function properly when the fluid lines are not in axial alignment with the cylinder. In the present invention the inlet and outlet lines may be held in a fixed position and the flow of fluid passed through the joint into a hydraulic cylinder which is out of alignment in any direction with the joint itself.

While this general type of fluid joint construction has many applications, it has been found particularly useful in modern aircraft where various elements are operated by hydraulic motors and due to structural strains and misalignment of the airplane the hydraulic operating lines and fluid joints and the motors themselves are moved with relation to each other. By the use of a joint as hereinafter described, a limited misalignment in any direction is permitted with the volume of inlet and exhaust fluid maintained at full capacity and without leakage at the joint.

In the drawings:

Fig. 1 is a cross-section taken on line 1—1 of Fig. 3 in the direction of the arrows;

Fig. 2 is an end elevation of Fig. 1;

Fig. 3 is a vertical section taken on line 3—3 of Fig. 1 looking in the direction of the arrows; and Fig. 4 is a vertical section taken on line 4—4 of Fig. 3 locking in the direction of the arrows.

As illustrative of one use of the invention, it is shown in connection with a conventional hydraulic motor cylinder 1 having a working piston 3, and piston rod 5 therein is reciprocated back and forth in the cylinder by fluid pressure means applied in both directions. As before stated, the piston rod 5 may operate any desired mechanism, not shown. The inner end of the cylinder 1 is attached to the swivellable fluid joint by bolts 7 passing through openings in the cylinder head 15 and cooperating with nuts 9 on the outer ends of bolts for binding against a clamp ring 11 against the annular shoulder 13 of the end of the cylinder 1. The cylinder head 15 also forms the hydraulic casing or extension 16 for the hydraulic operating lines and terminates into a substantially ball-shaped member 17, rotatably mounted within two spherical sections 19 and 21, the sections being held together by bolts 23 passing through the offset abutting edges of the special members. The adjacent edge portions of the spherical members 19 and 21 are partially cut away adjacent the extended portion of the fluid casing 15 so that the hydraulic motor may be moved relative thereto in a limited plane, the movement of the ball 17 being limited by the cut away edges 25 and 27 of spherical sections 19 and 21. Movement of the hydraulic motor with relation to the fixed spherical sections is accomplished by moving the hydraulic motor laterally in the slot defined by the cut away edges 25 and 27 of the spherical sections 19 and 21 until the central section 16 reaches the ends of the slot 29 or 31, as shown by the dash lines in Fig. 1, and the ball may also swivel or move within the limits of the slot as defined by the spacing of the edges 25 and 27.

The spherical ball holding sections 19 and 21 are provided with diametrically positioned inlet and outlet fluid ports 33 and 35 joined to rigid hydraulic fluid lines 37 and 39, respectively. The cylinder head 15 and fluid casing 16 terminating in the ball-like member 17 are provided with two horizontal fluid passages 41 and 43, respectively, for conveying fluid to and from lines 37 and 39. The fluid conduit 41 has its offset portion terminating in an enlarged diameter peripheral port 45 receiving and discharging fluid from the casing port 33. The second hydraulic passage 43 is also made with an enlarged lip or port 47. It thus will be obvious that when the hydraulic motor cylinder 1, with its end ball section 17, rotates between the limits of the edges 25 and 27, the two fluid circuits will always be open and fluid will pass in and out of pipes 37 and 39 as the discharge area of the enlarged lips 45 and 47 of pipes 41 and 43 is such as to compensate for this rotary or swivellable action. A tight fluid seal is maintained between the periphery of the inner spherical sections 19 and 21 by means of circular grooves 51 having O-rings 53 therein. This construction allows the movable parts to be lubricated by the hydraulic fluid while preventing actual leakage.

The fluid conduit 41 at the end of the fluid casing 16 adjacent the interior of the cylinder 1 is plugged by means of a machine screw 55 so that the fluid therein is blocked off and will pass through fitting 57 into piping 59 leading to the opposite end of the hydraulic cylinder, not shown.

I claim:

1. A swivellable, plural conduit pipe joint including a fixed portion comprising two semi-spherical members secured together, the corresponding abutting edges of the two members being cut away throughout a minor portion thereof to provide a slot therebetween, fluid inlet and outlet supply pipes leading to and from the semi-spherical members and a swivellable ball-like member having a radial extension thereon mounted within the two semi-spherical sections with the said radial extension projecting from the slot formed by the edges of the cut-away portions of the semi-spherical members, and fluid passages extending through said radial extensions and said ball-like member, the inner ends of said passages communicating with the fluid pipes leading to and from the semi-spherical members regardless of the position of said radial extension.

2. A swivellable, plural conduit pipe joint including a fixed portion comprising two semi-spherical members secured together, the abutting edges of the two members being cut away throughout a minor portion to provide a slot therebetween, fluid inlet and outlet supply pipes leading to and from the semi-spherical members and a swivellable ball-like member having a radial extension thereon mounted within the two semi-spherical sections with the said radial extension projecting from the slot formed by the edges of the cut-away portions of the semi-spherical members, and fluid passages in said radial extensions and said ball-like member, the inner ends of said passages being flared in diameter whereby the flared portions are always in communication with the fluid supply lines leading to and from the semi-spherical members regardless of the position of the radial extension in the slot.

3. A swivellable plural pipe joint including a pair of semi-spherical members having radial edge portions for securing the sections together, and a cut away portion forming a circumferential slot between a portion of the adjoining edges of the semi-spherical portion, fluid ports leading into the central spherical faces of the semi-spherical members, a plural conduit of lesser width and thickness than the circumferential slot mounted therethrough and terminating in a ball-like member of substantially the same diameter as the interior of the semi-spherical members, the inner ends of the fluid passages in the plural conduit are out turned in direction within the ball-like member and are in fluid communication with the fluid ports in the semi-spherical members when the plural conduit and ball-like member are moved within the confines of the slot.

4. A swivellable plural pipe joint including a pair of semi-spherical members having radial edge portions for securing the sections together, and a cut away portion forming a circumferential slot between a portion of the adjoining edge of the semi-spherical portion, fluid ports leading into the central spherical faces of the semi-spherical members, a plural conduit of lesser width and thickness than the circumferential slot mounted therethrough and terminating in a ball-like member of substantially the same diameter as the interior of the semi-spherical members, the inner ends of the fluid passages in the plural conduit are out turned in direction within the ball-like member, and spaced, parallel circumferential packing grooves of similar diameter formed on the ball-like member on opposite sides of the ends of the fluid passages therein, the ends of the pipes being in fluid communication with the fluid ports in the semi-spherical members when the plural conduit and ball-like member are moved within the confines of the slot.

5. A swivellable plural pipe joint including a pair of semi-spherical members having radial edge portions, means for securing the edge sections together, and a cut away portion forming a circumferential slot between a portion of the adjoining edges of the semi-spherical portions, fluid ports leading into the central spherical faces of the semi-spherical members, a plural conduit of lesser width and thickness than the circumferential slot mounted therethrough and terminating in a ball-like member of substantially the same diameter as the interior of the semi-spherical member, the inner ends of the fluid passages in the plural conduit being out turned in direction within the ball-like member, the orifices thereof being flared to a diameter greater than the diameter of the remainder of the passages and remaining in fluid communication with the fluid ports in the semi-spherical members when the plural conduit and ball-like members are moved within the confines of the slot and out of axial alignment.

THOMAS C. HILL.